United States Patent [19]

Smith

[11] Patent Number: 4,630,495
[45] Date of Patent: Dec. 23, 1986

[54] VARIABLE RATIO POWER TRANSMISSION MEANS

[75] Inventor: John D. Smith, Bristol, England

[73] Assignee: Fairey Hydraulics Limited, Hounslow, England

[21] Appl. No.: 465,085

[22] Filed: Feb. 9, 1983

[30] Foreign Application Priority Data

Feb. 11, 1982 [GB] United Kingdom ............... 8204040

[51] Int. Cl.⁴ .................. F16H 15/44; F16H 15/16
[52] U.S. Cl. .................................. 74/191; 74/348; 74/349; 74/458
[58] Field of Search .............. 74/424.5, 424.7, 425, 74/425.5, 191, 193, 458, 427, 348, 349

[56] References Cited

U.S. PATENT DOCUMENTS

| | | | |
|---|---|---|---|
| 994,037 | 5/1911 | Schwartz | 74/191 |
| 1,049,149 | 12/1912 | Roadhouse | 74/191 |
| 1,431,649 | 10/1922 | Gillette | 74/191 |
| 2,209,023 | 7/1940 | Jett | 74/191 |
| 2,711,105 | 6/1955 | Williams | 74/424.5 |
| 3,158,041 | 11/1964 | Rae | 74/193 X |
| 3,298,238 | 1/1967 | Lea | 74/191 |
| 4,192,200 | 3/1980 | McCoin | 74/191 |
| 4,192,201 | 3/1980 | McCoin | 74/191 |

FOREIGN PATENT DOCUMENTS

| | | | |
|---|---|---|---|
| 2160353 | 8/1973 | Fed. Rep. of Germany . | |
| 2552164 | 11/1975 | Fed. Rep. of Germany . | |
| 468203 | 4/1914 | France | 74/349 |
| 838442 | 3/1939 | France . | |
| 315320 | 2/1934 | Italy | 74/348 |
| 211996 | 1/1941 | Switzerland . | |
| 216390 | 12/1941 | Switzerland | 74/193 |
| 10416 | of 1900 | United Kingdom | 74/348 |
| 1035239 | 7/1966 | United Kingdom | 74/193 |
| 1455456 | 11/1976 | United Kingdom | 74/191 |
| 771385 | 10/1980 | U.S.S.R. | 74/424.5 |

OTHER PUBLICATIONS

Exhibit A–The Torrington Company–tech. bulletin on bearings–8 pages., 1977.

*Primary Examiner*—Allan D. Hermann
*Attorney, Agent, or Firm*—Millen & White

[57] ABSTRACT

There is disclosed a continuously variable ratio power transmission means comprising truncated cones having concave parabolic circumferential surfaces which surfaces are in rolling contact one with another and which can be moved in a linear fashion to provide a variable ratio dependent on point extent of overlap and rolling contact. In a preferred form of the invention positive drive is provided by a rack or band of gear teeth being provided in a helix around the periphery of each cone in a constant helix or lead angle.

19 Claims, 7 Drawing Figures

4,630,495

VARIABLE RATIO POWER TRANSMISSION MEANS

BACKGROUND OF THE INVENTION

This invention relates to a power transmission means, e.g., to achieve drive between an input and an output shaft, allowing for continuous variation of the drive between these shafts, even while the means of the invention is rotating. The transmission means of the invention relates in a preferred form to positive drive variable ratio power transmission means utilising gear teeth or the like in overall constant mesh between input and output members, the ratios nonetheless being continuously variable while the transmission means is rotating.

Variable ratio power transmission means are known which produce a substantially continuous variation of ratios between an input and an output, for example by the VARIOMATIC (trade mark) belt drive transmission adopted in DAF (trade mark) motor cars and the Perbury type gear which utilises disc rollers bearing against toroidal members. Both means rely on friction for their drive and their continuous variability of drive ratio. Positive drive gearboxes have hitherto provided variable ratios but not without a discontinuity or disruption of transmission between input and output.

OBJECTS OF THE INVENTION

It is an object of the present invention to produce a continuously variable ratio power transmission means which when used in frictional drive provides improvements over the known forms of frictional drive for example for motor vehicle application and moreover, when provided with gear teeth or the like gives a continuously variable ratio positive drive power transmission means in a manner previously not considered feasible. Other and particular advantages of the transmission means of the present invention will be apparent to those skilled in the art from a consideration of the present specification and claims.

SUMMARY OF THE INVENTION

According to one aspect of the present invention continuously variable power transmission means comprising input and output rolling members in rolling contact with one another is characterised in that the rolling members are truncated cones having their circumferential surfaces concave and substantially parabolic in axial section and having rolling contact lines (as hereinafter defined), the cones being mounted such that their contact lines substantially coincide for rolling contact between the cones during linear movement of one cone with respect to the other substantially parallel to the common contact line.

The cones are preferably of substantially equivalent axial length having bases and/or tops of different radii. The linear movement of the cones one with respect to the other will cause the cone bases and tops to be displaced from one another. The range of linear movement is preferably such as to permit a minimum of cone overlap (along the common contact line) of ⅓ and ⅓ i.e. to the point where about ½ the rolling contact line of each cone contacts the other. Greater or lesser ranges may, however, be used if required. The output cone may be affixed, base to base, to a third cone of like form which third cone is in rolling contact with a fourth cone of like form. What was in the two cone embodiment the output cone now becomes, with the third cone to which it is affixed base to base, an intermediate double cone member through which drive is transmitted to the fourth cone now comprising the output member. In this four cone embodiment the second and third intermediate cones are preferably substantially mirror images of one another and mounted for linear movement together parallel to the lines over which they contact the input and output cones. The input and output cones in this embodiment are preferably of substantially equivalent dimensions resulting in the input and output axes being substantially parallel.

In a further embodiment the transmission means may be extended still further by provision in this way of further like cones to provide any desired overall ratio of input to output, which ratio can be rared continuously by movement of the or each set of intermediate (or mirror image) rolling cones.

Where frictional contact between the respective cones is relied upon for transmission of power between input and output, the mounting of the said cones must provide sufficient loading of one cone against its neighbour adequately to transmit the available power in the required ratio and through the required range of ratios. However, in a preferred form of the invention the said cones are provided with gear teeth around their circumferential surfaces such that the cones are in constant mesh, linear movement of one in relation to the next resulting in continuously variable ratio positive drive. The teeth are preferably disposed around the parabolic circumference of each cone in a helical rack or band of constant lead or helix angle. The lead or helix angles of adjacent cones in mesh with one another are identical but their pitch will differ as each band precesses around and along its cone. The differing top and/or base diameters of adjacent cones using the same lead angle of gear tooth band means that the number of revolutions of the band of gear teeth around the smaller cone will be increased thus enabling the gear teeth of two adjacent cones to be engaged say at the large end and then progressively disengaged to the mid-section, and then progressively re-engaged towards the smaller end with full engagement at the extreme end. Movement of the two cones along their common contact line involves progressive engagement and dis-engagement along the cones both with rotational movement of the cones and also with linear movement. The teeth on each cone are set at a skew angle parallel to the rolling contact line.

According to a further aspect of the present invention is a rolling member for a variable power transmission means comprising a truncated cone having a concave circumferential surface substantially parabolic in axial section and having a substantially linear rolling contact line (as hereinafter defined) along substantially the length of which rolling contact may be made with the equivalent rolling contact line of a like cone. In this aspect of the invention a preferred feature is that a rack or band of gear teeth is disposed around the parabolic circumference of the cone, the rack or band having a constant lead angle and the teeth being set at a skew angle parallel to the rolling contact line.

BRIEF DESCRIPTION OF THE DRAWINGS

The operation of the invention the subject of this application will now be described by way of example with reference to the accompanying drawings. Moreover the invention may be embodied in various ways and some specific embodiments will also be described by way of example with reference to the accompanying drawings. In the accompanying drawings the respective figures show the following.

DETAILED DISCUSSION OF THE INVENTION

Figure 1:
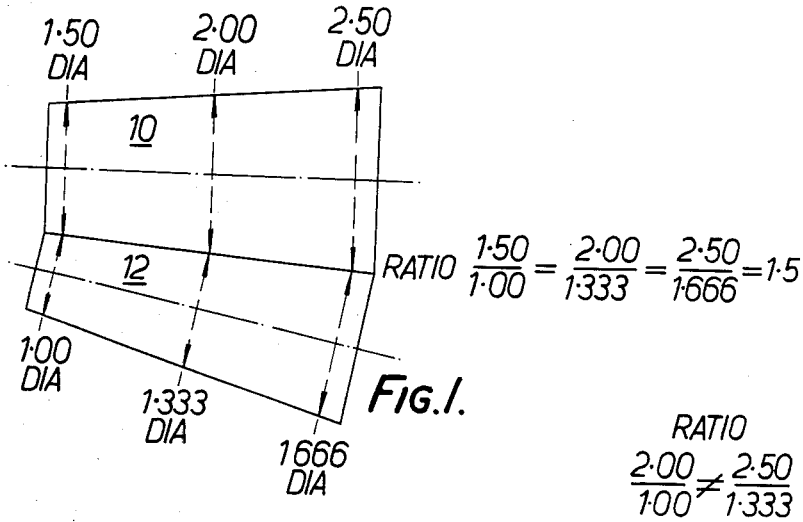
FIGS. 1 and 2 show as examples two truncated cones in rolling contact with one another (FIG. 1) and moved longitudinally with relation one to another (FIG. 2) whereupon constant rolling ratio is lost.

Referring to the drawings, it will be of assistance first to consider two tapered or bevelled rolling members 10 and 12 in the form of truncated cones having conical pitch surfaces as depicted in FIG. 1 rotating in frictional contact so that the pitch or circumferential surfaces thereof roll together. The dimensions indicated as "Dia" on FIG. 1 are diameters and may, for example, represent inches or centimeters of multiples thereof that may be required to produce a power transmission means for a desired purposes. The figures are, however, exemplary and it will be seen that they may be varied to produce a similar effect. From FIG. 1 it is however clear that all the diameters of the conical pitch or circumferential surfaces will roll together without slipping. Furthermore, the rotation of the cones 10 and 12 about their respective axes will be at a fixed ratio, that is to say 1.5:1.

Figure 2:
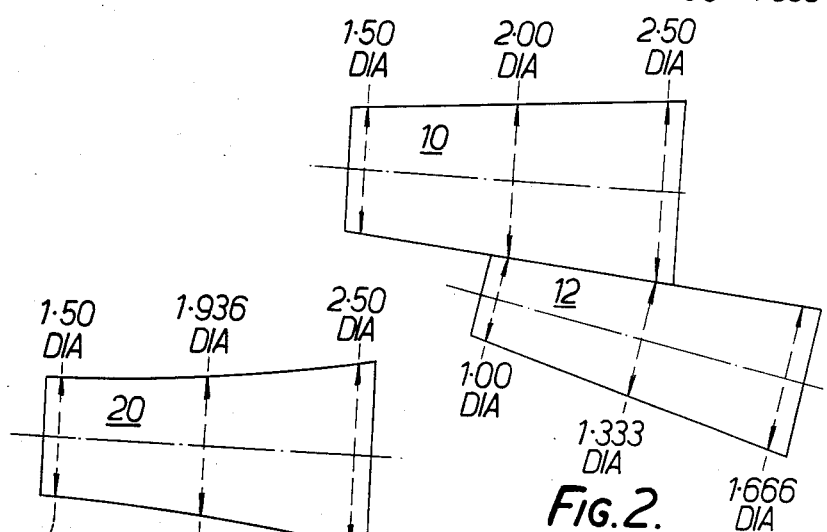

If an attempt is now made to vary the ratio between the shafts by displacing one cone with respect to the other as indicated in FIG. 2 then it will be seen that the rolling ratios differ along the line of contact and therefore that true rolling can no longer take place between the pitch or circumferential surfaces. Slipping results. FIG. 2 shows the cones in the substantially "½ and ½" overlap as discussed above.

Figure 3:
FIG. 3 shows two of the cones of the present invention each having concave circumferential surfaces substantially parabolic in axial section
Figure 4:
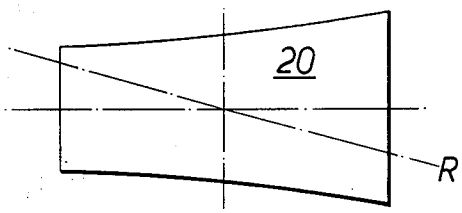
FIG. 4 shows a cone of the present invention and on it a rolling contact line in one axial plane

Turning now to FIG. 3 there will be seen two cones 20 and 22 which have in a sense been distorted from their linear equivalents in FIGS. 1 and 2 the distortion being to make their pitch or circumferential surfaces concave and parabolic in axial section. Clearly two such distorted cones 20 and 22 will not contact along their length in the manner previously described. However provided the difference between the respective ends (top and base) of each cone is not excessive there is a near straight line along the parabolic surface of each cone lying at a compound angle to the axis of the cone as shown for example at R on the cone 20 in FIG. 4. The line R is for the purposes of the present invention referred to as "the rolling contact line". FIG. 4 only shows the rolling contact line and its angular deviation from the cone axis in one plane. It will be appreciated that, if for example FIG. 4 is regarded as a plan view of the cone 20 and an elevation view is taken, that rolling contact line will be at an angle to the axis in that plane, hence the line R being at a compound angle in relation to the axis of the cone 20. It will be appreciated that there are an infinite number of rolling contact lines R around the circumference of a given cone of the present invention and indeed, also that a further series of rolling contact lines R exists around the periphery at an angle to the first rolling contact line but on the other side of the axis in any given plane.

Taking, for example, the two cones 20 and 22 as shown in FIG. 3 having the parabolic concave shaped surfaces and positioning them such that their rolling contact lines R are coincident enables the two cones 20 and 22 to make substantially rolling contact one with another without slipping. Moreover when one or the other is subjected to linear movement parallel to the common contact line rolling contact can be maintained but at another rolling ratio and indeed throughout movement of one cone in this way with respect to the other in a linear fashion there is a continuous variation of rolling ratio. The rolling contact line R forms a generatrix for the concave surface and is in essence a straight line which extends obliquely with respect to the axes of the cones without intersecting the apecies of the cones. Thus a continually variable frictional drive may be achieved if, for example, the larger of the cones 20 is connected to a power output of, for example, a motor vehicle engine, the smaller of the cones 22 therefore serving as the output. Approximate calculation of rolling contact ratios for the diameters given on FIG. 3 appear below:

NEUTRAL RATIO $$\frac{1.50}{1.00} = \frac{1.936}{1.291} = \frac{2.50}{1.666} = 1.5:1$$

MAXIMUM RATIO $$\frac{1.936}{1.00} = \frac{2.50}{1.291} = 1.936:1$$

MINIMUM RATIO $$\frac{1.50}{1.291} = \frac{1.94}{1.666} = 1.162:1$$

The two cones 20 and 22 when rolling together in the fashion described have their rotational axes at a compound angle one to another. Power transmission means using two such cones as sole input and output rolling members will in many cases require the use of universal or similar joints to bring the input and output into linear alignment. As an alternative, a four cone means substantially in the shape and disposition set out in FIG. 7 may be used the cones being numbered 20,22,22' and 24. The intermediate two smaller cones 22 and 22' are joined base to base in a permanent and drive transmitting fashion, the separate input and output cones 20 and 24 respectively being equivalent to one another. Movement of the intermediate cones 22 and 22' parallel to their rolling contact lines with the input and output cones 20 and 24 produces the variable ratio drive between the input and output shafts (not shown) the input and output being parallel. Moreover by arrangement of the axial lengths of the cones it may be feasible to bring the input and output back to linear rather than displaced parallel. The appearance on the cone of FIG. 7 of gear bands 30 to 33 is irrelevant to this aspect of the invention but will be described further below. Approximate calculations of input/output ratios for cones of FIG. 7 have diameters as in FIG. 3 appear below:

OVERALL RATIO $$\frac{1.50}{1.00} \times \frac{1.00}{1.50} = 1.00:1$$

-continued

MAXIMUM RATIO $$\frac{1.936}{1.00} \times \frac{1.00}{1.162} = 1.667{:}1$$

MINIMUM RATIO $$\frac{1.162}{1.00} \times \frac{1.00}{1.936} = 0.6{:}1$$

Figure 5:
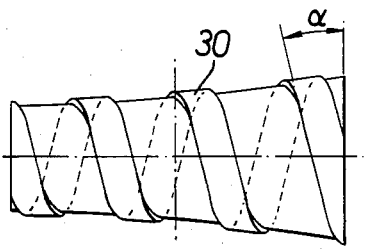
FIGS. 5 and 6 show the disposition of a rack or band of gear teeth on a cone of the present invention and FIG. 7 shows a double or 'four cone' transmission means.
Figure 6:
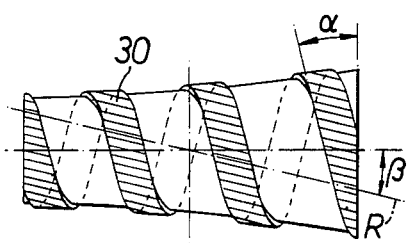
Figure 7:
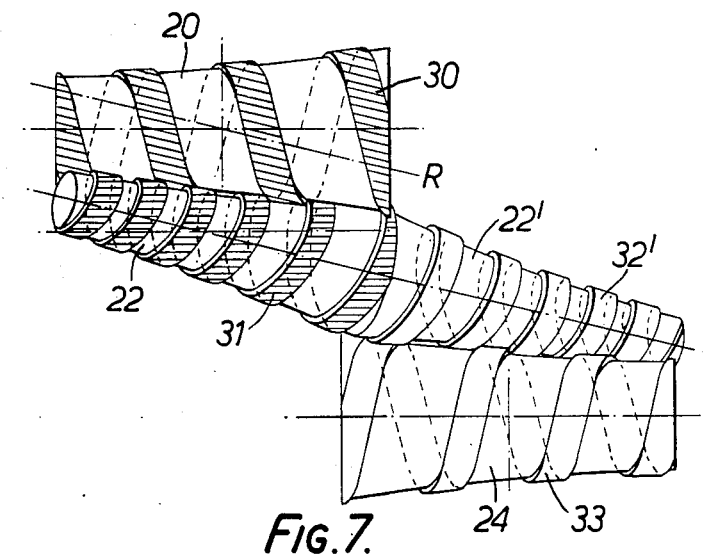

In a further embodiment of the invention in order to provide positive drive between say the two cones 20 and 22, a raised rib in the form of a helical rack or band 30 to 33 of gear teeth is formed around the circumference of each cone, the bands being shown on FIGS. 5, 6 and 7. The longitudinal width of each band is substantially constant along each cone and between two adjacent cones, and the helical band of each cone has a constant lead or helix angle α with the result that the helical pitch decreases as the diameter is reduced—again see FIG. 5. The gear teeth are set at a skew angle parallel to the contact line R of each cone, the skew angle β being such as to provide gear teeth substantially along the rolling contact line of that cone at any given point around the periphery. With the unit measurements given in FIG. 3, a rib about 0.4 units wide is provided on each cone, the gear teeth preferably being of conical involute form. A conical involute gear may be described as a bevel tooth which has a constant width slot between the teeth and which carries twice the angle of tooth as described by H. E. Merritt in his well known book entitled "Gears" the disclosure of which is incorporated herein by reference.

The fact that one gear cone e.g., 22, is smaller in diameter than an adjacent cone e.g., 20 whilst having a band or rack of gear teeth 31 and 30 in effect laid around its periphery having the same lead angle α in each case, means that the number of revolutions of gear teeth around the respective peripheries will be greater in regard to the smaller cone. This will enable the gear teeth of the two adjacent cones 20 and 22 to be engaged, for example, at the larger end (base), and then progressively disengaged through the mid-section, progressively re-engaging towards the smaller end (top) with full engagement at the extreme end. It follows that when the two cones 20 and 22 are moved linearly in relation to one another there will be tooth engagement one with another.

The toothed engagement is preferably arranged by suitable choice of lead angle and tooth construction such that with full overlap of cones, e.g., 20 and 22, there is at whatever point of rotation one with respect to the other a total in the region of one full tooth width meshing between the two cones 20 and 22, this meshing made up by partial meshing at discreet points along the length of the rolling contact line. With rotation of the two cones with respect to one another meshing of gear teeth will move along the rolling contact line R but maintain substantially the same overall summated amount of meshing. This is because the circular pitch of the gear teeth is constant as is the lead angle of the gear helix, and it therefore follows that wherever the gear teeth of one cone present themselves for contact with those of an adjacent cone will be correctly aligned along the rolling contact line as the same number of teeth will exist between the two contact points. Another way of considering the tooth disposition is to realise that there is a constant number of teeth for each unit length of axial cone length so that if the cone has its teeth in engagement in one place along its length, then wherever the teeth present themselves for re-engagement irrespective of the cone diameter, the number of teeth per unit length is constant so re-engagement will be ensured.

The basic cone blanks having concave parabolic circumferential surfaces may be produced by numerically controlled turning or other turning methods. Where a raised gear rack or band around the periphery is involved it may be produced by end milling and the teeth cut into it by end milling or other suitable means. The teeth are cut with a constant circular pitch as shown in FIG. 6.

With the compound 'four cone' arrangement of FIG. 7 the engagement of the respective pairs of cones meshing one with another are identical to that discussed above. The resulting ratio change is additive.

With cones of given axial length and base and top radial dimensions the parabola and positioning of rolling contact line are determined mathematically in order that rolling contact can be achieved as described. It is to be noted that with the application of the gear bands—in effect a rack of gears disposed around the periphery of each cone—that the same helix or lead angle must be used so that the two differently sized adjacent cones are compatible. The required helix or lead angle is again defined with respect to the rolling contact line for that cone mathematically. It is as stated above assumed to approximate to a straight line. Constraints on cutting through availability of equipment may involve this straight line deviating somewhat from end to end largely due to difficulties in cutting a true parabola. However within practical limits it is not expected that this need have any significant effect on the invention.

It is expected that a gearbox using the four cone arrangement of FIG. 7 would give a maximum ratio change in the region of 3:1, whereas a maximum ratio change in the region of 9:1 may, for example, be required for a normal domestic motor car. This ratio may be increased by increasing the axial length of the cones concerned but again increase in length may cause difficulties in the cutting of a true parabola giving a variation from a substantial straight rolling contact line. Thus it is preferred to increase the ratios by doubling or further multiplying of the numbers of pairs of cones (e.g. 20 and 22 with 22' and 24) involved.

As examples of the application of the transmission means of the present invention it may, for example, be possible in addition to using them in an appropriate scale as motor vehicle gearboxes, also using them for example to electric motors of various sizes so that they can be set easily for constant speed or constant torque with other properties varying accordingly.

It is anticipated to be critical in the case of geared positive drive transmissions according to the present invention that the two cones differ in overall dimensions one from another as identity of the positioning of teeth would imply the two cones to be wholly in mesh until movement linearly in the manner contemplated whereupon the teeth would progress to a point of being out of mesh.

I claim:

1. A rolling member for use in a continuously variable power transmission, the rolling member comprising a truncated cone having a concave circumferential surface, generated about an axis substantially parabolic in axial section and having a substantially straight rolling contact line extending along substantially the length of the surface and disposed at a compound angle with respect to the axis, whereby rolling contact may be made with an equivalent straight rolling contact line of a similarly configured cone.

2. A rolling member as claimed in claim 1 in which a rack or band of gear teeth is disposed around the parabolic circumference of the cone in a helical band of constant lead angle, the teeth being set at a skew angle parallel to the rolling contact line.

3. In a continuously variable power transmission including first and second rolling members in rolling contact with one another, the improvement characterized in that said rolling members are truncated cones generated around axes, having concave circumferential surfaces, being substantially parabolic in axial section and including straight rolling contact lines oriented at a compound angle to the axes of the cones; the cones being in continuous line contact along the rolling contact lines at a common line of contact which is fixed with respect to the axes of the cones;, whereby during linear movement of one cone with respect to the other in a direction substantially parallel to the common line of contact the rotational velocity of one cone with respect to the other cone changes.

4. The improvement of means as in claim 3 wherein said cones are of substantially equivalent axial length and have respective bases or tops of differing radii.

5. The improvement of means as in claim 3 wherein said second cone is affixed, base to base, to a third cone of like form, said third cone being in rolling contact at respective rolling contact lines with a fourth cone of like form, said third and fourth cones being mounted such that their said rolling contact lines substantially coincide for rolling contact between said cones during linear movement of one cone with respect to the other substantially parallel to the common contact line.

6. The improvement of means as in claim 5 wherein said second cone and said third cone are substantially mirror images of each other and are mounted for linear movement parallel to said rolling contact lines of said first and fourth cones.

7. A transmission means as in claim 5 wherein said first cone and said fourth cone are of substantially equivalent dimensions.

8. A transmission means as in claim 3 employing frictional drive between said first and second cones.

9. A transmission means as in claim 5 employing frictional drive between said third and fourth cones.

10. A transmission means as in claim 3 wherein the said first and second cones are provided with gear teeth such that said cones are in constant mesh, linear movement of one with respect to the other resulting in variable ratio positive drive.

11. A transmission means as in claim 5 wherein said third and fourth cones are provided with gear teeth such that said cones are in constant mesh, linear movement of one with respect to the other resulting in variable ratio positive drive.

12. A transmission means as in claim 10 wherein the said gear teeth are disposed around the concave parabolic circumference of each cone in a helical band of constant lead angle, the gear teeth being disposed parallel to the rolling contact line.

13. A transmission means as in claim 11 wherein the said gear teeth are disposed around the concave parabolic circumference of each cone in a helical band of constant lead angle, the gear teeth being disposed parallel to the rolling contact line.

14. In a continously variable power transmission, truncated cones in rolling contact with one another, each cone having a circumferential surface which is concave in axial section and has as a generatrix a straight line which extends in an oblique direction with respect to the axis of the cone without intersecting the apex of the cone; the cones being in contact with one another along a common rolling contact line which common rolling contact line is coincident with the generatrix of each cone, whereby said cones change relative rotational velocity during linear movement of one cone with respect to the other in a direction substantially parallel to the common contact line.

15. In a transmission as in claim 14, wherein each cone has an array of gear teeth thereon in which each tooth of the array has an engaging surface which extends parallel to and in coincidence with said contact lines.

16. In a transmission as in of claim 15, whereon the gear teeth on each cone proceed therearound as a helical band with the helical band on each cone having the same lead angle.

17. In a transmission as in claim 14 wherein said truncated cones include first, second, third and fourth cones with the first and fourth cones having parallel axes and the second and third cones being coupled to one another adjacent bases facing one another; the first and second cones being in engagement along respective rolling contact lines and the third and fourth cones being in engagement along respective rolling contact lines, whereby the cones change rotational velocity with respect to one another upon movement of at least one cone with respect to the other cones in a direction parallel to one of the rolling contact line.

18. In a transmission as in claim 16, wherein each cone has an array of gear teeth thereon in which each tooth of the array has an engaging surface which extends parallel to and in coincidence with said contact lines.

19. In a transmission as in claim 18, whereon the gear teeth on each cone proceed therearound as a helical band with the helical band on each cone having the same lead angle.

* * * * *